United States Patent Office 3,449,421
Patented June 10, 1969

3,449,421
CHLORINATION PROCESS
David L. Pearson, Aurora, Colo., assignor to Shell Oil Company, New York, N.Y., a corporation of Delaware
No Drawing. Filed Jan. 20, 1964, Ser. No. 338,568
Int. Cl. C07c 103/02
U.S. Cl. 260—561                                   7 Claims This invention relates to a process for the chlorination of N,N-di(lower alkyl) amides of acetoacetic acid selectively to form the corresponding alpha-monochloro-N,N-di(lower alkyl) amides of acetoacetic acid, with minimal formation of the corresponding alpha,alpha-dichloro amides.

As is shown in U.S. Patent No. 2,802,855, carbamyl-alkenyl esters of phosphoric acid are effective insecticides. A particular species of these esters—dimethyl 1-dimethyl-carbamyl-1-propen-2-yl phosphate—is now marketed commercially.

As is also shown in the patent, this insecticide can be prepared by reacting alpha-chloro-N,N-dimethylaceto-acetamide with trimethyl phosphite.

In turn, alpha-chloro-N,N-dimethylacetoacetamide has customarily been prepared by chlorinating N,N-dimethyl-acetoacetamide. Methods shown in the art for effecting this chlorination have left much to be desired, however, since such methods have resulted in incomplete conversion of the amide, and also have resulted in the production of substantial amounts of the alpha,alpha-dichloro amide. These combined effects markedly reduce the amount of the mono-chloro amide product. Further, if the crude product containing the dichloro amide is used in preparing the insecticide, the dichloro amide also reacts with the trimethyl phosphite to form dimethyl 1-dimethylcarbamyl-2-chloro-1-propen-2-yl phosphate, and this is highly undesirable, inasmuch as the chloro derivative is much inferior to the non-chloro phosphate as an insecticide, and has higher mammalian toxicity. This requires at least that the dichloro amide be removed from the crude chlorination product, and this is a very difficult operation, since the boiling points of the mono- and di-chloro amides are very close together, and other physical characteristics are similar. For like reasons, it is very difficult to separate the non-chlorinated phosphate insecticide from the chloro-derivative.

There is, accordingly, a need for a method for effectively chlorinating N,N-dimethylacetoacetamide selectively to alpha-monochloro-N,N-dimethylacetoacetamide.

It has now been discovered that N,N-dimethylaceto-acetamide is converted to a near-quantitative degree to alpha-monochloro-N,N-dimethylacetoacetamide, with formation of but very small amounts of the corresponding dichloro compound, by reacting N,N-dimethylacetoaceta-mide with a compound containing active chlorine. By conducting the chlorination with these chlorinating agents, the usual conversion of the amide is about 98–99 percent, with the yield of the mono-chloro amide being 97–98 percent and the yield of the dichloro amide being less than two, often less than one, percent. This discovery, which is the basis of the process of the invention, thus provides a highly efficient process for the preparation of alpha-mono-chloro-N,N-dimethylacetoacetamide.

It also has been discovered that this process is applicable to the selective chlorination of N,N-di(lower alkyl) amides of acetoacetic acid to the corresponding alpha-monochloro amides. The process is of particular interest for chlorination of such amides wherein each alkyl group contains from one to four carbon atoms.

The suitable chlorinating agents are those compounds containing "active" chlorine. By this is meant compounds in which the chlorine is present, or may be considered to be present, and/or which yield chlorine in the positive or cationic form—as the chlorinium ion, Cl+. For the most part, these compounds are those in which chlorine is attached directly to an electronegative nitrogen, oxygen or sulfur atom, typical suitable kinds of chlorinating agents being, for example, chloramine (monochloroammonia), N-chloro primary and secondary amines, Cl—NHR° and Cl—NR°R°, respectively, wherein R represents alkyl, preferably alkyl of from one to ten carbon atoms, of either straight-chain or branched-chain configuration; N-chloro-amides and imides, such as N-chlorourea, N-chloroaceta-mide, N-chloroacetanilide, N,4-dichloro- and N,2,4-tri-chloroacetanilide, N-chlorosuccinamide, N-chlorosuccin-imide, N-chlorophthalimide, mono- and di-chloro hydan-toins, N-chloroformamide and other compounds containing the structural moiety $R'—C(O)N(Cl)_m(R)_n$, wherein $m=1$ or $2$ and $m+n=2$, R and R' each is hydrogen or an organic group such as alkyl (preferably containing from one to ten carbon atoms, and of either straight-chain or branched-chain configuration), phenyl, including alkyl-substituted phenyl (the total number of carbon atoms in the alkyl group or groups, which may be of branched-chain or straight-chain configuration, being not more than ten), phenyl substituted by from one to a plurality of halogen (preferably middle halogen: bromine or chlorine), nitro, cyano, hydroxy, alkoxy (wherein the alkyl moiety or moieties are as already described), or phenalkyl (phenyl as just described) wherein the alkyl moiety contains from one to six carbon atoms and is of either straight-chain or branched-chain configuration, or R' is a radical such as the radical $—N(Cl)_o(R)_p$, wherein $o=0$, 1 or 2 and $o+p=2$, as in the ureas, such as N-chlorourea, N,N'-di-chlorourea, N-methyl N'-chlorourea and the like, or the group $—C(O)OR$, as in the urethanes, for example methyl N-chlorourethane, ethyl N-methyl-N-chlorourethane, phenyl N-chlorourethane, and the like, or the group $—C(S)OR$, as in the thiourethanes, such as methyl N-chlorothiourethane, or the group $—C(S)SR$, as in the dithio-carbamates such as methyl N-chlorodithiocarbamate, or the group $—C(O)SR$, as in the thiolcarbamates, including methyl N-chlorothiolcarbamates; also suitable are the corresponding thioamide compounds wherein the carbonyl oxygen is replaced by sulfur, and corresponding sulfoxa-mides and sulfonamides, such as Chloramine B and Chlor-amine T, and N-chlorooxamides. Other suitable chloro-amides include the isocyanurates, particularly those of U.S. Patents Nos. 3,035,054, 3,035,056 and 3,035,057.

Further suitable chlorinating agents, containing chlorine bonded to nitrogen, include the guanides and biguanides, such as those of U.S. Patent No. 2,945,061, including 1,1-dimethyl-2-chlorobiguanide and N,N'-dichloro-azodi-carbon-diamidine; benzenediazonium perchloride and pyr-idine dichloride.

Suitable chlorinating agents containing chlorine bonded to oxygen are hypochlorous acid and esters thereof, particularly alkyl hypochlorites of up to twenty carbon atoms, such as methyl, ethyl, n- and isopropyl hypochlo-rites, n-, sec- and tert-butyl hypochlorites, tert-amyl hypo-chlorite, 1,1-diethylethyl hypochlorite, n- and tert-heptyl hypochlorites, the di-hypochlorites of trimethylene glycol and of butanediol-1,4, dodecyl hypochlorite, tetradecyl hypochlorite, hexadecyl hypochlorite, n- and sec-octadecyl hypochlorites, and the like, cycloalkyl hypochlorites, such as cyclohexyl hypochlorite and the cycloalkyl hypochlo-rites of U.S. Patent No. 2,675,402, and aralkyl hypo-chlorites, such as benzyl hypochlorite, phenethyl hypo-chlorite, alpha-metyhlbenzyl hypochlorite, p-tolyl hypo-chlorite, and the like. These hypochlorites, too, may be substituted by from one to a plurality of middle halogen, nitro, cyano, hydroxy or alkoxy (as has already been described).

In all of the foregoing types of chlorinating agents, the organic group or groups present may be substituted by non-hydrocarbon substituents, as has already been described; however, it is preferred that such organic group(s) be hydrocarbon, since the resulting compounds are less likely to be involved in undesirable side reactions.

In many, if not most, cases, it will be found desirable to employ the pre-formed chlorinating agent; often, it will be found desirable to prepare the chlorinating agent just before use. In some cases, however, it may be found more desirable to form the chlorinating agent in situ in the reaction mixture—this most often in the cases where hypochlorous acid is employed, for it may be convenient and effective to form the acid by employing an aqueous reaction system and introducing molecular chlorine into the system where it reacts with the water to form the acid.

Where the physical characteristics of the chlorinating agent permit the formation of a workable reaction mixture—as where the chlorinating agent is liquid and/or miscible with or readily suspended in the amide reactant to provide a mixture which is readily handled and which permits efficient chlorination—it is possible, and may be desirable, to conduct the chlorination without use of any added diluent or solvent. However, it may be found desirable to include a suitable diluent or solvent which does not interfere with the chlorination, and whose presence improves the workability of the reaction mixture—as by providing fluidity, and/or providing a homogeneous reaction mixture, or the like. Where the chlorinating agent is water-soluble, water may be a convenient and effective solvent; and it may be found desirable in such a case, to include a substantially water-immiscible diluent which is a solvent for the chloro-amide product, since such appears to promote selectivity of the chlorination, and may assist in recovery of the chloro-amide product. Where a water-soluble chlorinating agent is employed, and the chlorination is carried out in an aqueous system, of course there should be employed initially at least that quantity of water which completely dissolves the chlorinating agent, and in most cases it will be found desirable to employ a moderate excess of water, since the presence of water appears to enhance selectivity of the chlorination without introducing any adverse effect. Because of this effect, it would seem best to relate the amount of water used to the amount of the amide to be chlorinated. In these terms, it is desirable to provide at least one mole of water per mole of the amide reactant, and it will be found in most cases preferable to provide at least about two moles of water per mole of the amide. Ordinarily, it will be found unnecessary—and undesirable as unduly bulking the reaction mixture—to provide more than about 10 moles of water per mole of the amide, and generally not more than about 7 moles of water per mole of the amide should be used. Where small proportions of water are used, inclusion of a suitable diluent may be desirable to provide fluidity to the reaction mixture.

Where an organic diluent or solvent is used, the amount thereof is not known to be critical and is selected to enable efficient conduct of the chlorination. In general, it is desirable that the diluent be a solvent for the amide reactant and the chloro-amide product, and also a solvent for the chlorinating agent. Suitable diluents include alcohols, aliphatic and aromatic hydrocarbons and chlorinated aliphatic and aromatic hydrocarbons—to avoid possible side reactions, it is preferred that the solvent be free from olefinic and acetylenic unsaturation.

The choice of a diluent in a particular case may well be based upon the character of the chlorinating agent that is employed. Thus, water is a suitable diluent, particularly where the chlorinating agent is hypochlorous acid (which can be generated in situ by reaction of chlorine with the water), N-chloroamides such as N-chlorourea and the like. Where an alkyl hypochlorite is used as the chlorinating agent, a suitable solvent may be the alcohol having the same alkyl moiety—tertiary-butyl alcohol being a suitable solvent when tertiary-butyl hypochlorite is used, for example. Hydrocarbons or chlorinated hydrocarbons are generally suitable for use with most organic hypochlorites, suitable diluents including lower molecular weight alkanes, that are liquid in the reaction mixture under the reaction conditions, for example, pentane, hexane, nonane, decane, isopentane, and the like, aromatic hydrocarbons such as benzene, xylene, toluene, ethylbenzene, and the like, poly-chlorinated lower alkanes that are liquid under the reaction conditions but which boil below about 120° C., such as methylene chloride, chloroform, carbon tetrachloride, 1,1- and 1,2-dichloroethane, 1,3-dichloroethylene, propyl and isopropyl chlorides, 1,1,2-trichloroethane, 1,1,1-trichloroethane, amyl chloride and the like.

In the majority of cases the polychloro alkanes, i.e., methylene chloride, chloroform and carbon tetrachloride, are effective, are cheap and readily available, and therefore are most convenient. Also suitable are chlorinated aromatic compounds such as chlorobenzene, the dichloro and trichlorobenzenes and the like. It is to be noted that even when a non-aqueous solvent is employed, it may be desirable to include in the reaction mixture trace to minor amounts of water for example, up to 1 mole of water per mole of amide reactant.

When water is present in the reaction mixture, it is desirable that the reaction mixture not be basic, but that it be at least neutral and preferably acid. If the hypochlorous acid is to be generated from a metallic hypochlorite, such as calcium or sodium hypochlorite, precaution must be taken to insure that the solution is initially—before chlorination is begun—neutral to slightly acid.

Even when water is not present in the reaction mixture, use of basic chlorinating agents should be avoided. Thus where a chlorinating agent such as pyridine dichloride is used, it preferably is used in the form of its hydrogen chloride salt.

In general, it is desirable from the standpoint of the selectivity of the chlorination, to avoid use of an excess of the chlorinating agent, relative to the amount of amide used. Where hypochlorous acid is used as the chlorinating agent, it generally is desirable to employ slightly less—for example, 1 to 2 percent less—than the stoichiometric amount of the acid, to minimize the possibility of dichlorination. It is undesirable to employ less than 95–97% of the stoichiometric amount of the acid, however, since reduction in the amount of the acid causes corresponding reduction in the amount of amide that is converted. Where a hypochlorite per se is used as the chlorinating agent, it ordinarily will be found best to employ essentially the stoichiometric quantity of the agent, relative to the amount of amide.

As has already been pointed out, when hypochlorous acid is employed, it may be formed by using water as solvent, and adding chlorine thereto. In determining the amount of chlorine to be used, it may be assumed that the chlorine reacts completely with the water. Of course, the hypochlorous acid can be prepared in other known ways, as by treating chlorine water with mercuric oxide, by bubbling chlorine oxide ($Cl_2O$) into water, by acidifying a solution of sodium or calcium hypochlorite, or by dissolving in water a compound such as chloramine-T, which in water liberates hypochlorous acid.

The degree of selectivity of the chlorination appears to be related to the temperature under which the chlorination is conducted, with slight decrease in selectivity as the temperature is raised. The minimum temperature that may be used is the freezing point of the reaction mixture; in general, however, to avoid unduly slow reaction times, it is desirable to conduct the chlorination at a temperature of at least 0° C., and preferably the chlorination is conducted at room temperature or above to avoid refrigeration. At reaction temperatures of about 30 to 40° C., using readily available chlorinating agents, the amount of the dichloro-amide ordinarily is of the order of 0.5 percent by weight or less. At reaction temperatures of the order of 60–70° C., about 1.5 percent by weight of the dichloro-amide is formed. To maintain the formation of the dichloro-amide below about 2 percent by weight, it is therefore necessary to maintain the reaction temperature below about 80° C., with temperatures below about 60° C. being preferred.

Preferably, to assure control of the reaction and avoid excessive local reaction temperatures, the chlorinating agent is gradually added to the amide in the presence of a substantial amount of the solvent, the mixture being well stirred. To further moderate the reaction, and avoid local high temperatures, it may be desirable that the chlorinating agent be mixed with solvent. The rate at which the chlorinating agent can be added to the amide will depend to a very substantial extent upon the thoroughness of mixing—if adequate mixing is maintained, the chlorinating agent can be added quite rapidly, but if only poor mixing can be maintained, then it should be added slowly.

The manner in which the chloro-amide product is best recovered from the reaction mixture will depend upon the character of the chlorinating agent used, and upon the character of the solvent used. Where hypochlorous acid is used, water being the solvent, recovery of the product is in most, if not all, cases effected most conveniently by selective extraction of the final reaction mixture with a suitable organic solvent, then recovering the product from that solvent. Suitable solvents are those which have already been indicated to be suitable solvents for the reaction mixture. Such a procedure also is most suitable when the chlorinating agent used is one which yields a water-soluble, organic liquid-insoluble product on loss of the positive chlorine therefrom—for example, where N-chloro-urea is the chlorinating agent. Any material insoluble in the crude reaction mixture should be just removed by filtration or decantation. Where an organic solvent is used, the chlorinating agent being soluble therein, distillation techniques offer the most convenient and effective methods for recovery of the chloro-amide product.

The process of this invention for preparing alpha-monochloro-N,N-dimethylacetoacetamide from N,N-dimethylacetoacetamide is illustrated in particular instances in the following examples, which are included only for the purpose of illustrating the conduct of the process.

EXAMPLE I

In laboratory experiments, 1 gram-mole of chlorine gas was added to a mixture of 5 gram-moles of water, 0.5 gram-mole of urea and 1 gram-mole of N,N-dimethylacetoacetamide (DMAA), the mixture being maintained at 0–45° C. Under these conditions, the conversion of the DMAA to alpha-monochloro-N,N-dimethylacetoacetamide (CDMAA) typically was above 95%, with the product typically analyzing 1–2% unreacted DMAA, 97–98% CDMAA and less than 0.5% alpha,alpha-dichloro-N,N-dimethylacetoacetamide (DCMAA). The mole ratio of water to DMAA has been varied from 2.5 to 10, and the mole ratio of urea to DMAA has been varied from 0.125 to 3, without significant effect upon the conversion of DMAA and composition of the product. The product typically was recovered by multiple extraction of the aqueous phase with chloroform, then removing the chloroform. The urea is believed to be converted to N-chlorourea in situ, and also hypochlorous acid is formed by reaction of the chlorine with the water.

EXAMPLE II

The procedure of Example I was scaled up: 0.647 pound-mole (85.8 pounds of 97.5% purity) DMAA, 3.3 pound-moles (59.4 pounds) of water and 0.325 pound-mole (19.5 pounds) of urea were mixed and 0.638 pound-mole (45.3 pounds) of gaseous chlorine was added over a two hour period, the reaction mixture being maintained at 55–65° F. The aqueous reaction mixture then was extracted 5 times with 89 pounds of chloroform per extraction. The combined chloroform extracts were neutralized with 10 gallons of dilute aqueous sodium bicarbonate solution and the chloroform solution then stripped to terminal conditions of 180° F. at 35 Torr. to give 101.6 pounds of product analyzing (by weight) 1.9% chloroform, 1.1% DMAA, 96.4% CDMAA and 0.6% CDMAA. Conversion of DMAA to DMCAA=92.6%.

EXAMPLE III

It has been found that inclusion of at least a minor amount of urea in the hypochlorous acid system effects somewhat greater selectivity in the chlorination, particularly when the chlorination is conducted at temperatures in the upper portion of the permissible range. The reason for this is not known with certainty. It is possible that the urea is converted in situ to N-chlorourea, and the combination of chlorinating agents (N-chlorourea and hypochlorous acid) effects the more selective chlorination. This effect is demonstrated by repetition of the experiments of Example I, omitting the urea. At 0° C., the results are very similar to those obtained from the experiments in which urea was included, but as higher reaction temperatures are used, the amount of DCDMAA increases, until at reaction temperatures of about 50° C., the product contained about 2% by weight of DCDMAA.

EXAMPLE IV

The experiments of Example I also were conducted, but modified in that the chlorinating agent was pre-formed by first reacting the urea-water solution with the chlorine, then adding the solution to the DMAA. The results obtained were not significantly different.

EXAMPLE V

Tertiary-butyl hypochlorite (TBHC) was used as chlorinating agent in several experiments as follows:

(A) No solvent.—Tertiary-butyl hypochlorite (TBHC) was prepared by bubbling chlorine gas at 20° C. into a solution of 112.0 grams (2.8 moles) of sodium hydroxide, 103.6 grams of tertiary-butyl alcohol (TBA) and 1445 grams of water. The upper oily phase that appeared was separated, washed with 100 milliliters of 5% sodium carbonate solution and then with four 100 milliliter portions of water to give TBHC in 86% yield.

TBHC (46.8 grams, 0.43 mole) was added dropwise to DMAA (57.1 grams, 0.45 mole) at 20° C. the resulting mixture was distilled to 90° C. at 2 mm. to give 68.2 grams of residue analyzing 6.6% w. DMAA, 90.7% w. CDMAA and 1.4% w. DCDMAA.

(B) Tertiary-butyl alcohol solvent.—TBHC was prepared by bubbling chlorine gas at 20° C. into a heterogeneous mixture of 112.0 grams (2.8 moles) of sodium hydroxide, 414.4 grams (5.6 moles) of TBA and 500 grams water. The gain in weight indicated a 97% m. yield.

The TBHC solution (94.0 grams, 0.41 mole TBHC) was added dropwise at 80° C. to DMAA (55.0 grams, 0.43 mole). The resulting reaction mixture was distilled to give 61.6 grams of residue analyzing 2.1% w. CDMAA, 94.4% w. CDMAA, and 1.2% w. DCDMAA.

(C) Chloroform solvent.—TBHC (79.3 grams, 0.73 mole, prepared as in (A) was added dropwise over a 1 hour period at 10° C. to a solution of 94.7 grams (97.5% purity, 0.71 mole) DMAA in 93.8 grams of chloroform. The reaction mixture was then distilled under reduced pressure to give 125.0 grams of residue analyzing 1.0% w. DMAA, 95.5% w. CDMAA and <0.5% w. DCDMAA. Yield of DMCAA based on DMAA charged was 99+%.

I claim as my invention:

1. A process for preparing an alpha-chloro-N,N-di (lower alkyl) amide of acetoacetic acid, which comprises reacting in liquid phase an N,N-di (lower alkyl)

amide of acetoacetic acid with not more than a stoichiometric amount of a chlorinating agent selected from the group consisting of:
  (a) hypochlorous acid,
  (b) alkyl esters of hypochlorous acid wherein the alkyl has from 1–20 carbon atoms, and
  (c) a mixture of hypochlorous acid and N-chlorourea, at a temperature between about 0° C. to 80° C., said chlorinating agent providing the sole source of active chlorine.

2. The process of claim 1 wherein each of the alkyl groups of the amides is methyl.

3. A process for preparing an alpha-chloro-N,N-di lower alkyl (amide of acetoacetic acid, which comprises reacting an N,N-di(lower alkyl)amide of acetoacetic acid with an aqueous solution of hypochlorous acid, at a temperature between about 10° C. to 60° C., said hypochlorous acid providing the sole source of active chlorine.

4. The process according to claim 3 wherein the hypochlorous acid is formed in situ by reaction of chlorine with water.

5. A process for preparing an alpha-chloro-N,N-di (lower alkyl) amide of acetoacetic acid, which comprises reacting in liquid phase an N,N-di(lower alkyl)amide of acetoacetic acid with not more than a stoichiometric amount of an organic hypochlorite selected from the group consisting of methyl hypochlorite, isopropyl hypochlorite, n-butyl hypochlorite and tertiary butyl hypochlorite, at a temperature between about 0° C. to 80° C., said hypochlorite providing the sole source of active chlorine.

6. A process for preparing an alpha-chloro-N,N-di (lower alkyl)amide of acetoacetic acid, which comprises reacting in liquid phase an N,N-di(lower alkyl)amide of acetoacetic acid with not more than a stoichiometric amount of an aqueous solution of hypochlorous acid and N-chlorourea, said aqueous solution of hypochlorous acid and N-chlorourea providing the sole source of active chlorine.

7. The process of claim 5 wherein the N-chlorourea and hypochlorous acid are formed in situ by reaction of chlorine, water and urea.

References Cited

Beilsteins Handbook der Organischen Chemie, 4th ed., vol. 3, p. 662, Berlin, Verlag Julius Springor, 1918.

Kretov, Chem. Abs., vol. 50, column 16692 (1956).

Mewes, Liebig's Ann, Chemie, vol. 245, pp. 58–59 relied on (1888).

Smith, Jour. Amer. Chem. Soc., vol. 44, pp. 216–7.

Trippetta, Chem. Abs., vol. 55, column 1642 (1961).

HENRY R. JILES, *Primary Examiner.*

N. TROUSOF, *Assistant Examiner.*

U.S. Cl. X.R.

260—694